Oct. 23, 1928.

A. A. SCHEUER 1,689,158

TOY GAME COLOR CHART

Filed Nov. 30, 1927   2 Sheets-Sheet 1

Alfred A. Scheuer
INVENTOR.

BY:
Charles M. Palmer
ATTORNEY.

Oct. 23, 1928.
A. A. SCHEUER
1,689,158
TOY GAME COLOR CHART
Filed Nov. 30, 1927
2 Sheets-Sheet 2
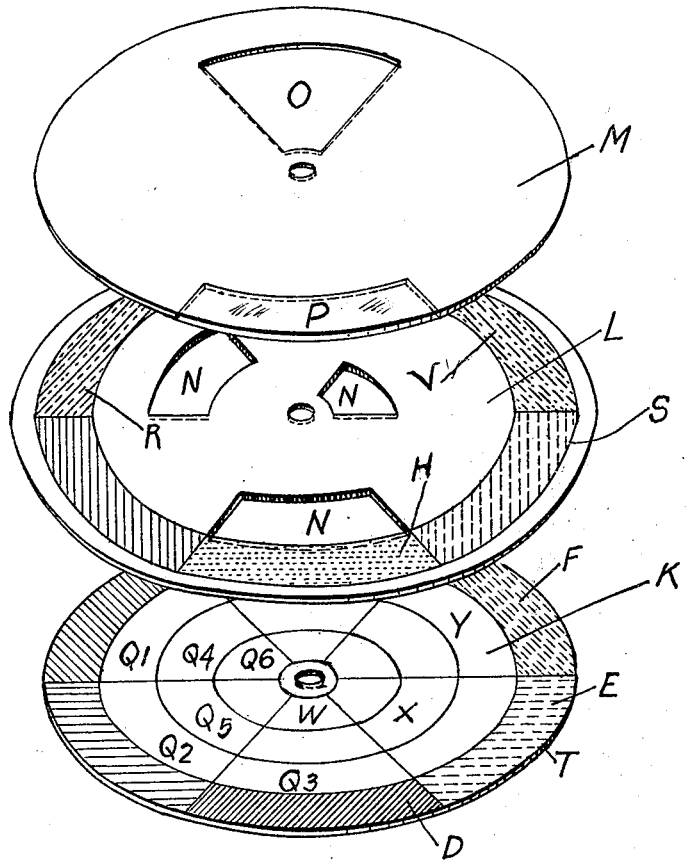
FIGURE 6
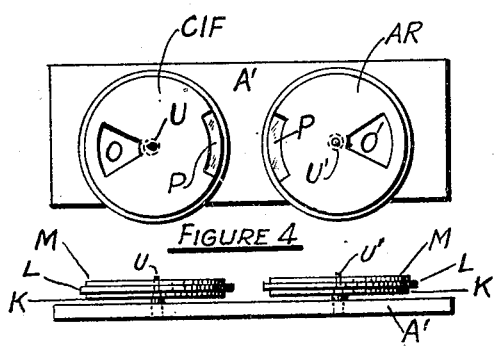
FIGURE 4
FIGURE 5
Alfred A. Scheuer
INVENTOR.
BY Charles M. Palmer
ATTORNEY.

Patented Oct. 23, 1928.

1,689,158

UNITED STATES PATENT OFFICE.

ALFRED A. SCHEUER, OF NEW YORK, N. Y., ASSIGNOR OF ONE-FOURTH TO HARRY VICTOR AND ONE-TENTH TO ADELE PALMER, BOTH OF NEW YORK, N. Y.

TOY GAME COLOR CHART.

Application filed November 30, 1927. Serial No. 236,769.

My invention relates to improvements in a toy and game device adapted for use as a color chart.

Broadly speaking, one object of the invention is in the provision of novel means for selectively obtaining a color combination corresponding to a predetermined framed interrogatory.

Another object of my invention is to provide a construction having spaced groups of superimposed discs containing interrogatories and corresponding answers.

Another aspect and a further advantage thereof is in the provision of means whereby color combinations of one group serve as a criterion for determining the corresponding answer to a framed interrogatory.

Specifically another object is in the utilization of a single platform for supporting spaced but independent groups of superimposed discs having a variegated display of colors.

More particularly, the object of this invention is in the provision of an educational toy game which will work with rapidity, accuracy and ease, and at relatively small expense.

A further object of my invention is to provide an educational toy game, especially adapted for children's use in forming a device which not only teaches interesting facts but additionally renders entertainment and amusement when operated.

Another object of my invention is to provide a toy game having complemental independent color display schemes whereby, through selectively operating one color scheme, the latter is utilized in determining the complemental color.

In this type of construction and a further aspect thereof I may utilize spatially disposed groups of superimposed color discs for matching color combinations.

The invention aims further, as above intimated, to improve generally and enhance the utility of devices of that type hereinafter described.

It is to be understood that the apparatus herein disclosed is merely suggestive of a type of apparatus that may be employed in carrying out the new method of operation, it being understood that any other suitable apparatus of different construction and arrangement of different elements may be employed within the spirit and scope of the invention.

The invention is exemplified in the combination and arrangement of parts shown in the accompanying drawings and described in the following specifications, and it is more particularly pointed out in the appended claims.

Referring to the drawings:

Fig. 4 is a plan view of a modification.

Fig. 5 is a front elevational view of the modification illustrated in Fig. 4.

Fig. 6 is an enlarged fragmentary exploded view of a modification of the interrogatory color finder or answer recorder.

Figure 1:
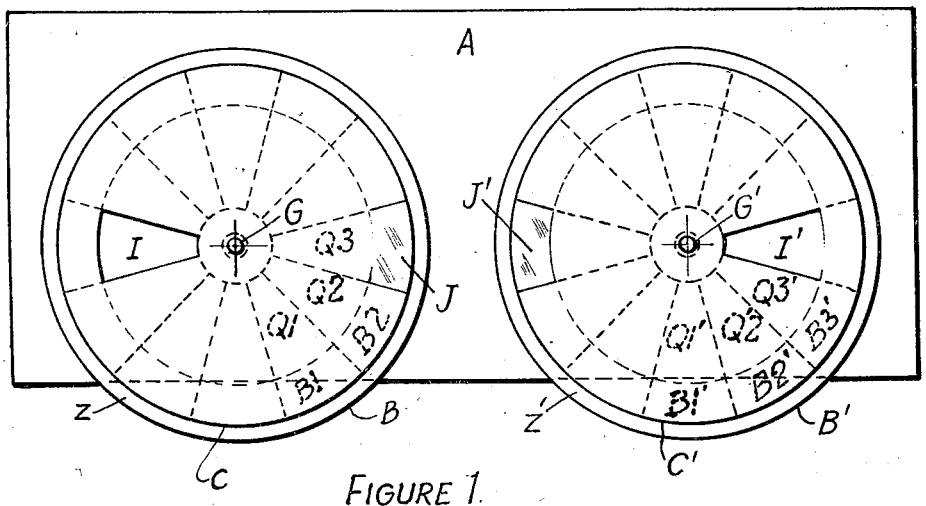
Fig. 1 is a plan view of the device.
Figure 2:
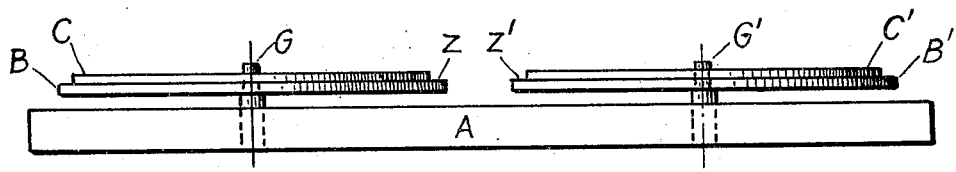
Fig. 2 is a front elevational view.
Figure 3:
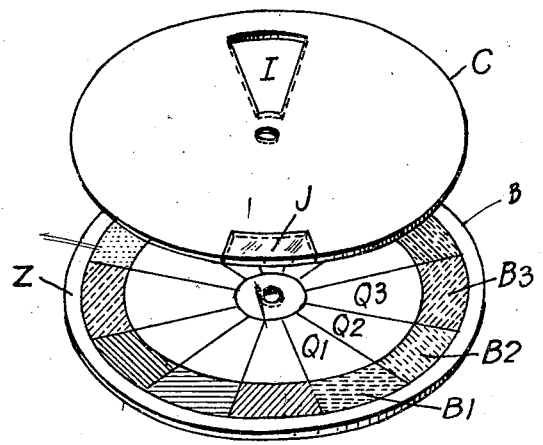
Fig. 3 is a fragmentary view in perspective of the interrogatory color finder.

In the drawings, Figs. 1, 2 and 3, the elongated platform is designated by A and disposed thereon in spatial relationship are the elevated post members G and G'. Associated with post G and loosely mounted thereon is the interrogatory color finder, generally denoted by reference characters B and C. The answer indicator B' C' is loosely and rotatably mounted on post G'.

The color finder consists of a pair of superimposed discs B and C. The former embodies a circumferentially disposed band of variegated colors or combinations represented by $B^1$, $B^2$, $B^3$, etc., and is provided with the marginal peripheral manipulating portion Z. Preferably the upper face of disc B is divided into a plurality of sectors $Q^1$, $Q^2$, $Q^3$, etc., in each of which an interrogatory or any other suitable information of interest or educational or color value may be placed. Zones $B^1$, $B^2$, $B^3$, etc., may be of transparent colors of any combination, or may be made of opaque colors by suitable stamping or printing the variegated color display on disc B. It is within the scope of my invention to subdivide the disc B into any number of radially disposed sectors and into any given number of color zones. The color band on the lower manipulating disc B consists of a number of separate zones such as $B^1$, $B^2$, $B^3$, etc., forming a circumferential closed band. Zone $B^1$ may be coated with a pigment color red; zone $B^2$ may be a hue of pigment blue; zone $B^3$ may be yellow; the remaining zones of the band contain a color independent of the other color zones.

Each color zone is provided with a corresponding independent sector. For instance, for zone $B^1$, sector $Q^1$ is provided; for color zone $B^2$ sector or section $Q^2$ is provided, etc. It is in these sections that a question or interrogatory is suitably stamped or printed. Illustrating this idea:—let $Q^1$ additionally be considered as calling for the question "What great President was an inventor"; $Q^2$ may also represent schematically an indicia question such as:—"Who is the American air ambassador of good will"; likewise $Q^3$ may be considered as representing an indicia question, etc. In other words, for each sector of the lower disc there is provided a zone of one color.

In superimposed relationship with the interrogatory color disc B is the exposure disc C, having the transparent color window J, or in place of the latter disc C may be provided with a cut-away portion similar in design to the transparent portion J. Disc C is further provided with the opening I, conforming substantially in design to the sectors in which the interrogatories are printed. It follows, that when the lower disc is rotated upon member G, any question of the lower disc may be exposed or registered in the window I of the upper disc C, concomitantly recording the corresponding section color zone of band $B^1$, $B^2$, $B^3$, etc., in the marginal window J.

The answer indicator is mounted on post element G' and consists of a bottom disc B' having the marginal manipulating portion Z' and embodying the circumferential band of colors divided into zones $B^{1\prime}$, $B^{2\prime}$, $B^{3\prime}$, etc., corresponding in their color display to the display of color band $B^1$, $B^2$, $B^3$, etc., of the finder. Disc B' is further provided with a plurality of radially disposed sector $Q^{1\prime}$, $Q^{2\prime}$, $Q^{3\prime}$, etc., containing the answers to the questions of the finder disc B. The upper framing recording disc C' embodies the opening J', in which a transparent, plain or colored window may be secured exposing the color band and the sector opening I' for framing or registering the answers in sectors $Q^{1\prime}$, $Q^{2\prime}$, $Q^{3\prime}$, etc. The color band $B^{1\prime}$ $B^{2\prime}$ $B^{3\prime}$ etc., of the answer disc B' also constitutes a closed bank of colors of which $B^{1\prime}$ must be of a color pigment red corresponding in hue to zone $B^1$; $B^{2\prime}$ must be blue to correspond to color of $B^2$; $B^{3\prime}$ must be yellow or of the color of zone $B^3$, and the remaining color zones on disc B' should correspond to the remaining colors of the finder disc B. In sections $Q^{1\prime}$, $Q^{2\prime}$, $Q^{3\prime}$, etc., the answers of questions $Q^1$, $Q^2$, $Q^3$, etc., are found, respectively. Thus, $Q^{1\prime}$ represents schematically the answer "Abraham Lincoln"; $Q^{2\prime}$ calls for "Charles Lindbergh"; $Q^{3\prime}$, of course, would represent the answer to question of $Q^3$, etc. It will be understood that the color sequence of the recorder band colors need not be of the same order as the zone finder colors. The important factor regardless of the color sequence is that a question on the finder and the corresponding answer on the recorder be identified by zones of the same color. Moreover, the transparent color toning plates J of the finder and J' of the answer recorder must be of the same transparent color, that is, each must be transparent yellow, both transparent green of the same hue, or any other same transparent color which would easily merge with the zone colors of the color bands to produce a modulated toned color, namely, a combination color or third color formed of the zone colors of the bands and the transparent color toner either of the finder and recorder.

In the operation of the device, it will be apparent that where it is desired to determine the answer to the question raised in the finder, disc B is rotated until the proper question of the sectors $Q^1$, $Q^2$, $Q^3$, etc., is framed and registers with the opening I. Where an interrogatory is framed, a color zone of band $B^1$, $B^2$, $B^3$, etc., is likewise exposed to view at the window J. The combination color viewed consists of the component colors of the transparent color window J modulation or color toner and that of band $B^1$, $B^2$, $B^3$, etc. The combination color noted at J may be viewed by reflected light where the color band $B^1$, $B^2$, $B^3$, etc., is opaque, or by transmitted light where the color band consists of transparent colors. To determine the answer to the frame interrogatory, disc B' is rotated and adjusted until a corresponding matched combination color, as at J, on the finder appears at window J'. The correct answer is now registered and framed and may be observed through sector opening I'. For example it is desired to find the answer to the questions represented by $Q^1$, accordingly disc B would be rotated until $Q^1$ is framed and exposed in the opening I in disc plate C. In this position the transparent color window or plate J would be over a color zone of the closed band. The merger of the zone color and the plate color is the modulated color visibly indicated at the color plate J. This third color is the criterion color, upon which solely the proper operation of the device hereinbefore set forth depends. To obtain the answer for question $Q^1$, after determining the combination color, the latter is matched on the indicator by revolving plate or disc B' when the corresponding zone color comes under or registers with the transparent color plate J'. In this position section $Q^{1\prime}$ is framed in the opening I' indicating the answer which is stamped or printed in this section, also broadly represented by the symbol $Q^{1\prime}$. Thus it will be seen that the operation of the device depends upon color control, to wit, the merger of two independent colors to form a complex color which is referred to in matching corresponding independent colors to produce the corresponding complex color.

The modification shown in Figs. 4, 5 and 6 is closely analogous in structure and operation to the species described in Figs. 1, 2 and 3 of the drawing, the exception being that the interrogatory color finder and the answer indicator, in view of their design, contain a larger number of questions and corresponding answers respectively. To this end, it is apparent that platform A' carries the spaced posts U and U', on which is mounted the interrogatory finder CIF and the answer indicator AR, respectively. The finder and indicator each consists of superimposed discs KLM. The lower disc is provided with a marginal color band T, comprising a number of independent color zones circumferentially arranged, such as D, E, F, of which zone D may be red; zone E blue; zone F yellow, etc. This color band may be transparent or opaque. Disc K embodies the plurality of concentric zones W X Y, being radially disposed and defining sectors such as $Q^1$, $Q^2$, $Q^3$, $Q^4$, $Q^5$, $Q^6$, etc., in each of which an interrogatory is stamped, printed or affixed in any well known manner, or said sectors may contain any suitable printed information or the like. In Fig. 6 three concentric zones, W, X and Y, are disclosed, but it is within the scope of my invention to provide any number of concentric zones between the periphery of the disc and its origin. Where a larger number of zones are provided a larger number of interrogatory and answer zones is obtained. The number of zones needed is merely discretionary with the designer of the structure.

Disposed upon the disc K is the intermediate color disc L and the latter embodies the marginal variegated color band S comprising independent marginal color zones H, R, and V, which are transparent. For instance, H, may be a transparent red; R, a transparent blue and V, a transparent yellow. Spirally arranged and in spatial relationship on disc L are the apertures N—N—N, for exposing either the answers or questions disposed within sections W, X and Y on disc K. It will be noted that an aperture N is provided for a single marginal color zone and the number of apertures is proportional to the number of concentric sections disposed between the marginal color band D, T, F, etc., and the origin of plate E. In this construction three concentric sections W, X, Y, are illustrated and accordingly three apertures spirally arranged on disc L are provided. The upper disc M is supported by the intermediate disc L and the former is provided with the marginal cut-away portion P, in which a transparent, plain or colored window may be inserted, and is further provided with the window opening O.

It will be understood that the color finder CIF and the answer indicator AR are mounted on the platform A' on posts U and U', respectively. The answer indicator and interrogatory finder are identical in construction, with the exception that the former contains answers in zones $Q^1$, $Q^2$, $Q^3$, etc., in place of questions or interrogatories on the color finder with the understanding, of course, that the question on the finder and the corresponding answers thereto on the recorder are identified by a band zone of the same color on the lower disc T as heretofore explained in connection with the modification of Figures 1 to 3, inclusive.

Where it is desired to obtain the answer of a question, discs L and M of the finder are rotated until one of the apertures N exposes or frames the question desired when in registration with the apertures O of the upper disc M. Through opening or window P, the color combination formed by the color band S and this color band T is exposed. With the combination color as a criterion, discs L and K of the indicator AR are rotated until this same color combination appears through opening or window P of the indicator. Accordingly, the corresponding answer to the question framed in the finder will be exposed by the apertures N and O of the recorder at O'. Of course, color bands S and T may be either transparent or opaque.

It will be appreciated that with the device that I have disclosed it is possible to match colors. For example, in Fig. 3 the color combination is formed by the zones of sections $B^1$, $B^2$, $B^3$, etc. with the transparent color shield J. By rotating discs B' and C', the color combination appearing at J may be matched at J' of the indicator. Similarly, a combination color on the finder CIF may be matched on the indicator of the modification in Figs. 4, 5 and 6.

The complement of a color may also be determined with my device. For instance, a question is framed on the finder seeking information for the complemental color. Where a question is framed, a color scheme is also exposed. The color scheme is matched on the answer indicator and complemental color designation appears as the answer at I'.

From the foregoing description, considered in connection with the accompanying drawings, it is believed that several novel structural features of my present improvement, as well as the advantages thereof in practical operation, will be readily appreciated. Because of the simple form of the various elements entering into the disclosed construction, the device may be produced at comparatively small manufacturing cost. I have described and illustrated in the accompanying drawings a structural embodiment of the device which I have found to give highly satisfactory results, and it will be obvious to those skilled in the art, after an understanding of my invention, that other changes and modifications may be made without departing from the spirit and scope of my invention, and I aim in the appended claims to cover such changes and modifications as are within the scope of my invention.

I claim:

1. In a device of the class described embodying means for framing an interrogatory, means for exposing a color combination corresponding to the framed interrogatory, means independent of the framing means for setting up the color combination and means responsive to the latter for exposing the corresponding answer to said framed interrogatory.

2. A game comprising finder means for framing an interrogatory corresponding to a color and answer means independent of the framing means whereby a corresponding color to the finder color may be indicated.

3. A game adapted for determining the answer to a framed interrogatory comprising means for framing the interrogatory, means responsive to the framing means for indicating a color, in combination with means whereby said color is framed for indicating a corresponding answer to the framed interrogatory.

4. A game adapted for determining corresponding answers to framed interrogatories embodying a platform, in combination with spaced posts thereon, and of rotary color means disposed on said posts for framing said interrogatories and corresponding answers therefor.

5. In combination with means for determining the answer to corresponding interrogatories comprising a platform having a pair of spaced posts, rotary means for framing an interrogatory whereby a color combination is exposed and means for setting up the latter in determining the corresponding answers.

6. In a device of the class described embodying a platform, in combination with posts thereon, of means independently disposed on said posts for framing an interrogatory together with exposing a color and indicating the corresponding answer of the interrogatory together with the corresponding color.

7. An interrogatory finder embodying a closed band of colors and provided with an interrogatory zone for each color and means for modulating each of said colors.

8. An answer indicator embodying a closed band of colors and provided with an answer zone for each color and means for toning said colors comprising a transparent color plate.

9. A color finder embodying rotatable superimposed discs, a color band and interrogatory section for each color thereof on one of said discs, and means on the finder for merging or toning each of the band colors into a combination color.

10. A game comprising a platform embodying a color finder and color indicator, the finder and indicator embodying superimposed discs, and means for toning and transforming the finder colors and means for finding the transformed colors on the indicator.

11. A game comprising a platform embodying color rotatable interrogatory and answer indicator means comprising independently superimposed and independently spaced discs, means for transforming and toning the finder colors and means for finding the transformed colors on the indicator.

12. A game comprising a platform embodying color rotatable interrogatory and answer means consisting of color bands having interrogatory and answer zones for each color thereof, and means for modulating the said colors.

13. In a game the combination with a platform having a pair of posts, and an interrogatory color finder disposed on one of the posts comprising superimposed discs having a color band, and an interrogatory zone for each color thereof, interrogatory framing and exposing means, and a transparent color plate for modulating and toning each color of said band, an answer indicator rotatably mounted on the other post comprising superimposed discs having a color band, and answer zone for each color thereof, answer framing indicatory means and a transparent color plate for finding the toned and modulated color of the finder.

14. An answer indicator embodying superimposed discs, a color band and answer zone for each color thereof on one of the discs and means on the indicator for merging and modulating each of the colors into a combination color.

Signed at New York in the county of New York and State of New York.

ALFRED A. SCHEUER.